United States Patent [19]

Burke

[11] Patent Number: 5,520,418
[45] Date of Patent: May 28, 1996

[54] AUTOMATIC HOSE UNCOUPLING DEVICE

[76] Inventor: Donald D. Burke, 9719 N. Flora, Kansas City, Mo. 64155

[21] Appl. No.: 389,024

[22] Filed: Feb. 15, 1995

[51] Int. Cl.$^6$ .................................................. F16L 35/00
[52] U.S. Cl. .............................. 285/2; 285/39; 285/307; 285/906; 137/614.05
[58] Field of Search ........................... 285/1, 2, 34, 304, 285/307, 906, 614.02; 137/614.05, 614.06; 251/149.6

[56] References Cited

U.S. PATENT DOCUMENTS

| | | | |
|---|---|---|---|
| 2,806,716 | 9/1957 | Brown | 285/1 |
| 3,383,122 | 5/1968 | Richardson | 285/1 |
| 3,386,754 | 6/1968 | Morrison | 285/1 |
| 4,009,729 | 3/1977 | Vik | 137/614.05 |
| 4,060,219 | 11/1977 | Crawford | 137/614.05 X |
| 4,269,226 | 5/1981 | Allread | 285/1 X |
| 4,392,513 | 7/1983 | Parrish | 285/311 X |
| 4,533,161 | 8/1985 | Burke et al. | 285/1 |

*Primary Examiner*—Dave W. Arola
*Attorney, Agent, or Firm*—Richard P. Stitt

[57] ABSTRACT

An automatic disconnecting device is provided for hoses containing pressurized gas or liquids. The disconnecting device is activated upon user application of excessive lateral tension to the hose resulting in lateral displacement of the automatic disconnecting device resulting in release of the hose coupling release ring which secures the hose to the supply nipple.

5 Claims, 16 Drawing Sheets

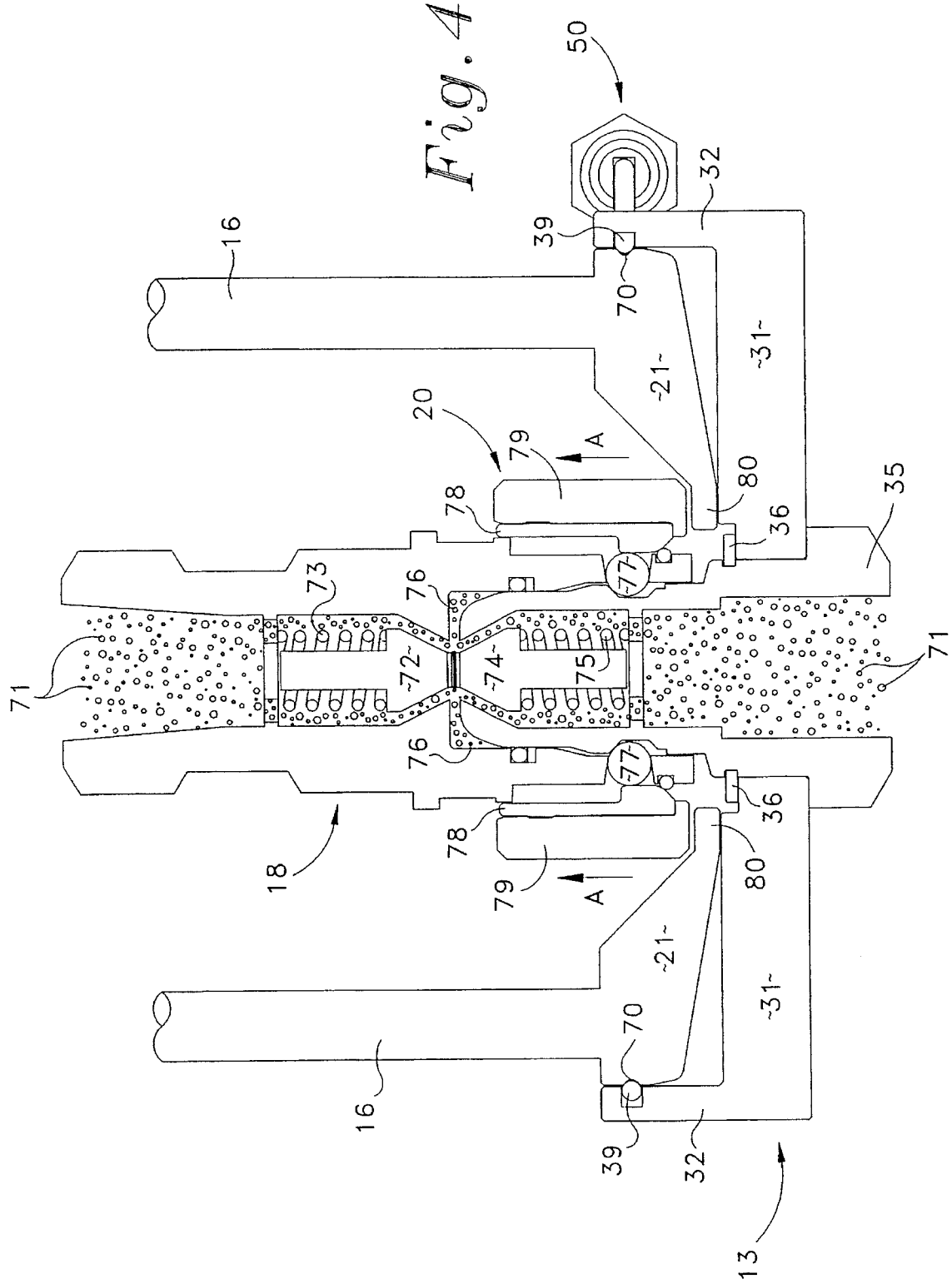

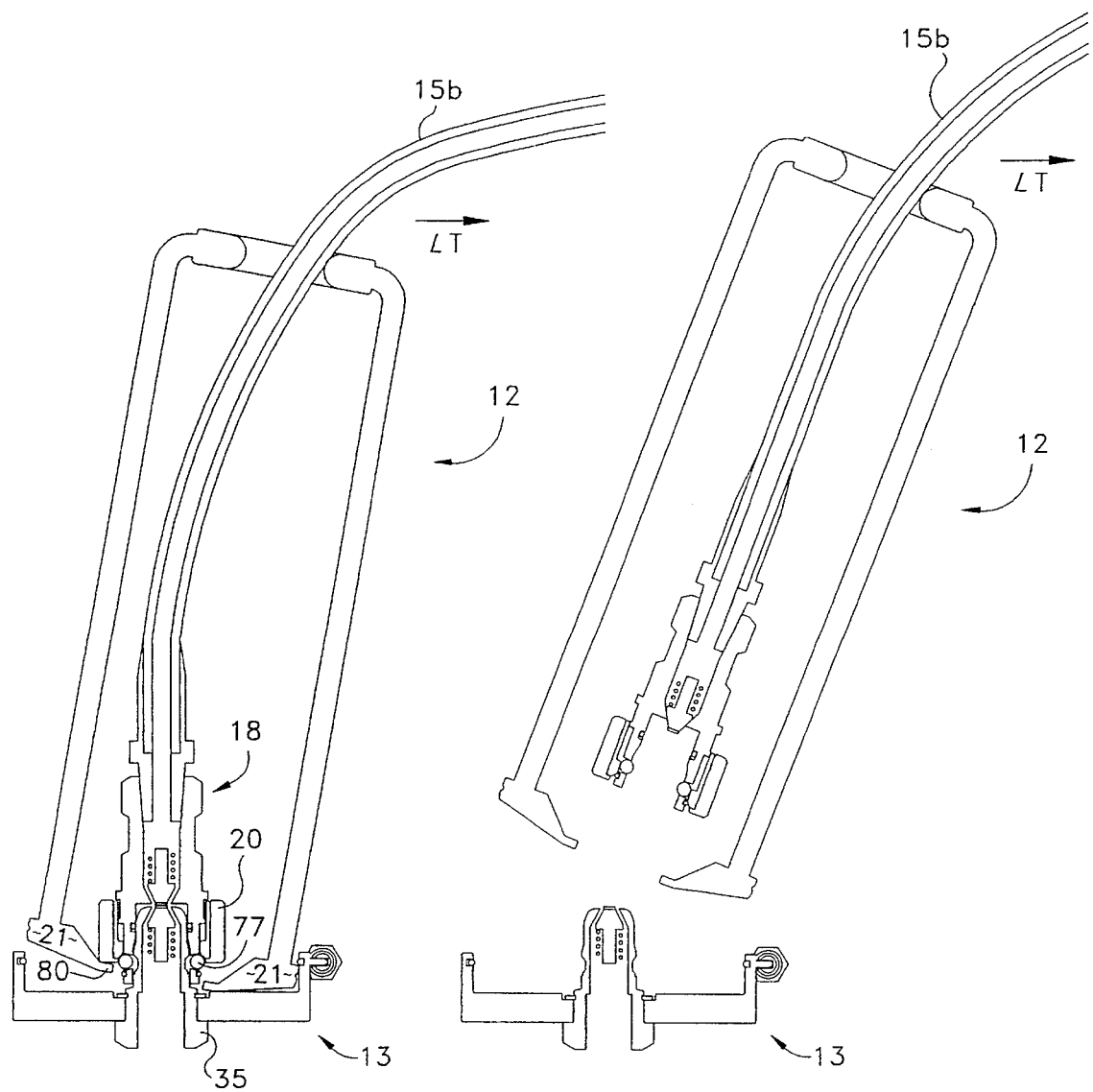

5,520,418

AUTOMATIC HOSE UNCOUPLING DEVICE

FIELD OF THE INVENTION

This invention relates to connectors for high pressure fluid and/or gas connections and, particularly to an automatic mechanical hose disconnecting device activated by excessive user tension on the hose.

CROSS REFERENCE TO RELATED APPLICATIONS

A related device is contained in U.S. Pat. No. 4,533,161 to Burke, et al which presents an alternative hose uncoupling device.

BACKGROUND OF THE INVENTION

This invention is incorporated with high pressure coupling devices that are commonly found and have the following characteristics in common: They are provided in male and female portions. Each of the coupler halves contain a spring loaded check valve that retains fluids and/or gases in the adjoining lines when the halves are disconnected. The check valves are opened as the coupling halves are joined together, thus permitting unrestricted flow of the contained fluid and/or gas through the coupling. The coupling halves, when coupled, are releaseably held together by a snap ring or detent balls in the female half which catch in a recess in the male portion. These retention rings or balls are held in place by a sliding sleeve on the female portion. Movement of the sliding sleeve allows the retention balls or rings to retract themselves from their locked position, thus allowing the coupler to disconnect. Disconnection of the coupler results in a sealing of the contained fluids and/or gases at that point. Heretofore, hose uncoupling devices which operated on conventional hose couplings provided no effective means of controlling the force required to produce the uncoupling action. The exact force required to uncouple was relative to the pressure contained in the coupling when acted upon by an uncoupling device. Further leveraging type devices as referenced in the 161 patent may provide too little or two much leverage depending upon the system pressure acting upon the coupler components at any given time. Thus, breakaway may occur prematurely or not at all due to improper leverage being applied for the system pressure being dealt with. Another factor affecting breakaway force was the construction materials and relative hardness of the materials used in coupling components when used with uncoupling devices. An excessive brinelling of the coupler sliding sleeve could occur from the pressure of the retaining balls against the sliding sleeve under pressure. This change in contact surface condition would directly affect the forces necessary to operate the coupler thus further reducing predictability of operation. Additionally, irregularities in manufacture and alignment of components would also contribute to unreliability of the units.

SUMMARY OF THE INVENTION

It is a principal object of the present invention to provide a device for use with existing and more preferably with specialized coupling mechanisms for the purpose of uncoupling these devices with a predetermined and adjustable remotely applied force that will remain relatively constant regardless of the pressure contained in the coupling device. Another object of the present invention is to provide a uncoupling device that provides greater leverage and controlled alignment of components to assure reliable operation.

A further object of the present invention is a device by which a high pressure coupler can be operated in an automatic manner as a safety device separating high pressure lines while preventing the expulsion of gases and/or fluids as the lines separate.

The foregoing and other objects are not meant in a limiting sense, and will be readily evident upon a study of the following specification and accompanying drawings comprising a part thereof.

BRIEF DESCRIPTION OF THE DRAWINGS

FIG. 4 is a fragmentary cross-sectional view taken along lines 4—4 of FIG. 7 and showing the interconnection of the assembled tower and seat sections and the interior of the hose connections;

FIG. 11c is the cross-sectional view of FIG. 11b, but showing increased lateral tensioning of the hose by a user against the tower containment ring and showing the coupler release collar fully lifted by the tower base to permit tower and hose separation;

FIG. 11d is the cross-sectional view of FIG. 11c, showing the completed separation of the tower and hose from the seat section due to continued user lateral tensioning of the hose.

FIG. 12a is an enlarged fragmentary view of FIG. 11a;

DETAILED DESCRIPTION OF THE PREFERRED EMBODIMENTS

Figure 1:
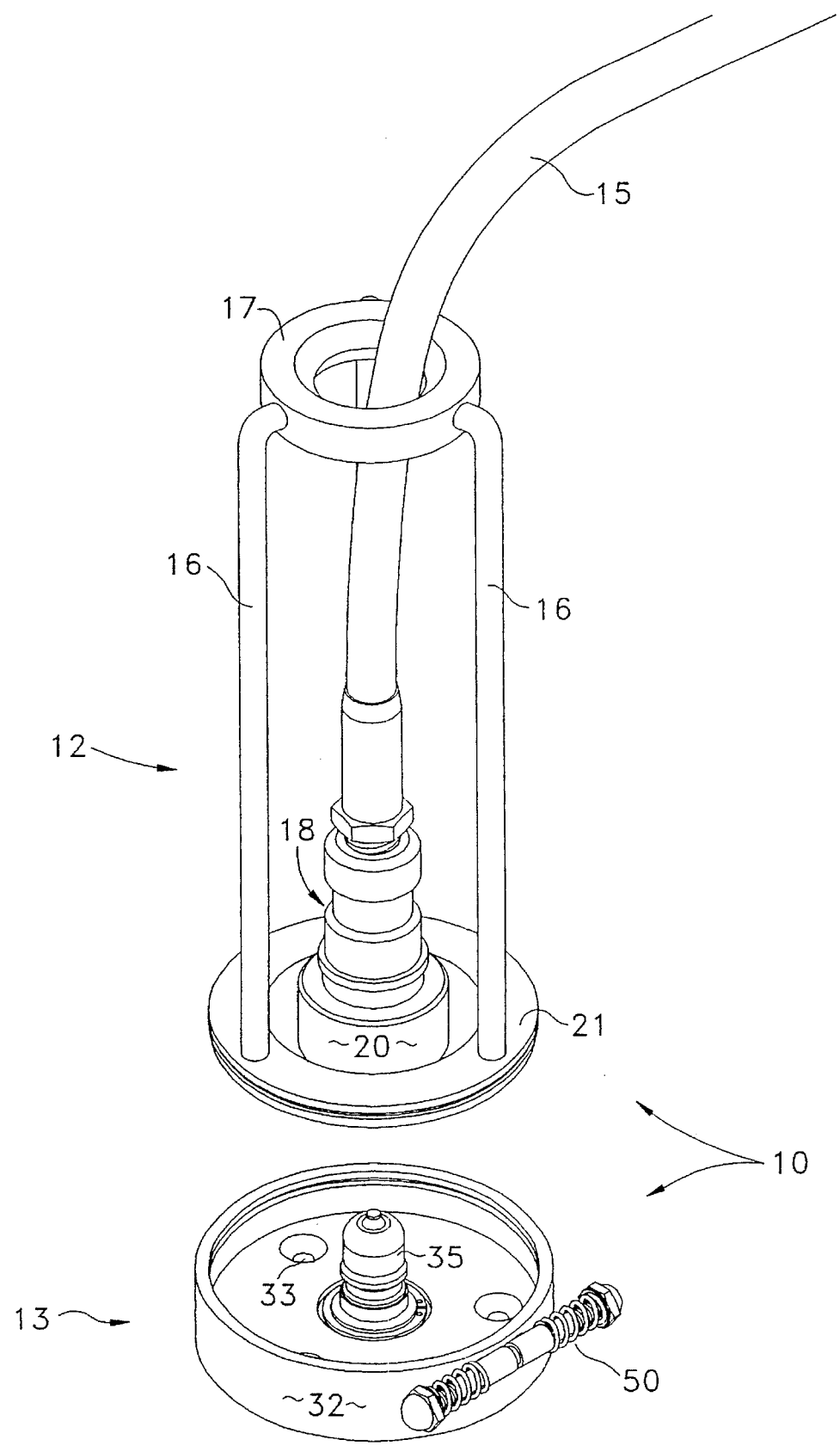
FIG. 1 is a perspective view of the automatic hose uncoupling device having a hose therein with the tower section spaced from the seat section for clarity.

Referring now to FIG. 1, the automatic uncoupling device 10 is shown with the tower section 12 spaced above the seat section 13. Hose 15 is shown inserted into tower 12 by placing hose 15 through hose containment ring 17. Hose 15 terminates in coupler 18 having release collar 20 thereon.

Figure 2:
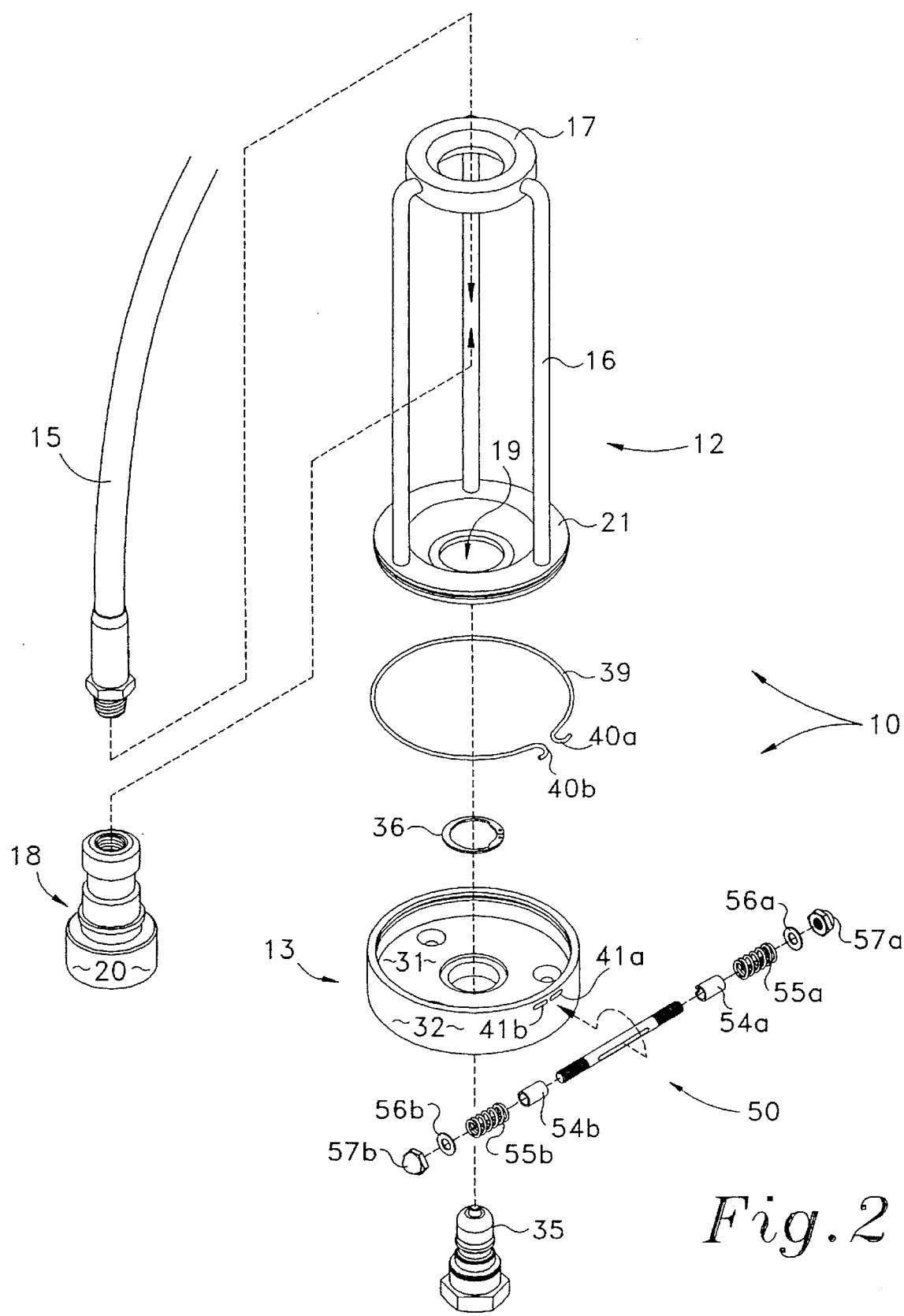
FIG. 2 is an exploded perspective view of FIG. 1 showing the general assembly of the components of the device.

Referring now to FIG. 2, an exploded view of automatic uncoupling device 10 of FIG. 1 is shown. The operation and interconnection of the component parts of automatic uncoupling device 10 will be described in detail hereinafter.

Figure 3:
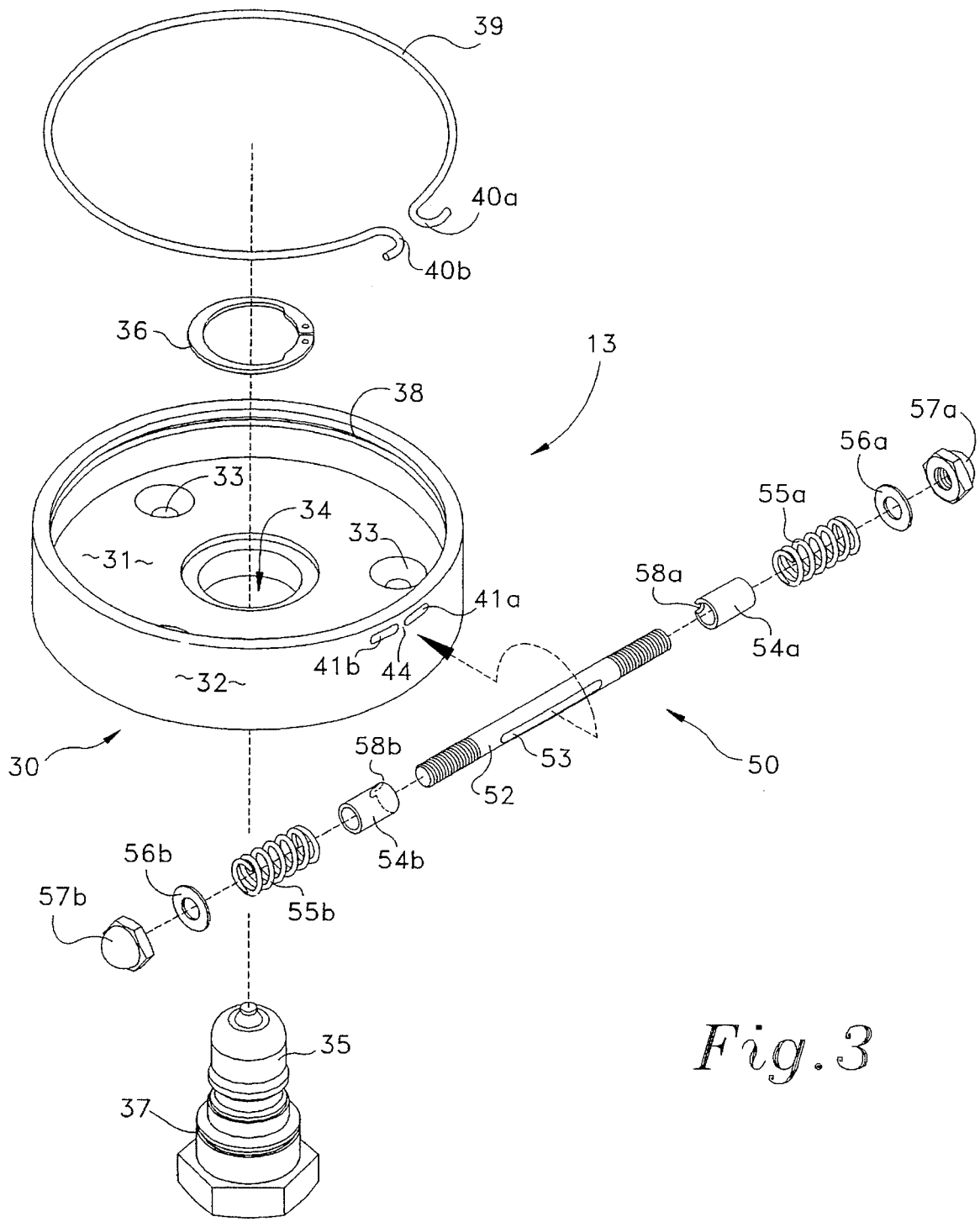
FIG. 3 is an enlarged exploded perspective view of the seat section of FIG. 1.

Referring now to FIG. 3, the relationship of the components of seat 13 will be described. Seat 13 is comprised of a base 30 having a generally flat bottom plate 31 and a circumfrential wall 32 surrounding bottom plate 31. Attachment holes 33 are provided in bottom plate 31 to permit securing of seat 13 to a mount. Generally centered in bottom plate 31 is void 34 through which nipple 35 may be inserted. Nipple 35 is press fit into void 34 and is secured therein by placement of snap ring 36 underneath retaining collar 37 of nipple 35 after insertion of nipple 35 in void 34.

Around the interior of wall 32 is groove 38 into which compression ring 39 is fitted. The diameter of compression ring 39 is adjusted by tensioning means 50 which is attached to hooked ends 40a, 40b of compression ring 39. The operation of tensioning means 50 to adjust the diameter of compression ring 39 and consequently adjust the amount of leverage required to separate tower section 12 (FIG. 1) from seat section 13 will be discussed in detail hereinafter.

Still referring to FIG. 3, an exploded view of tensioning means 50 is shown. Tensioning means 50 is comprised of tensioner rod 52 having slot 53 therein. Slot 53 captures hooked ends 40a, 40b of compression ring 39 as hooked ends 40a, 40b are extended through eyes 41a, 41b in wall 32 of base 30. Sleeves 54a, 54b are slidably mounted on tensioner rod 52 and capture a portion of hooked ends 40a, 40b in notch 58a, 58b (hidden from view) of sleeves 54a, 54b. Sleeves 54a, 54b are biased against hooked ends 40a, 40b of compression ring 39 by spring 55a, 55b. The amount of compression on springs 55a, 55b may be increased or decreased by tightening or loosening of nut 57a, 57b on tensioner rod 52. For smooth operation of nut 57a, 57b against spring 55a, 55b shim 56a, 56b is inserted therebetween.

Alternatively, sleeves 54a, 54b may be varied in length and nuts 57a, 57b then tightened against springs 55a, 55b until nuts 57a, 57b stop against rod 52. In this manner a consistently reproducible constriction of compression ring 39 is achieved as the length of sleeves 54a, 54b will then dictate the amount of force provided to hooked ends 40a, 40b. A similar variation in compression may be achieved by adding to or removing from the number of shims 56a, 56b used in tensioner means 50.

As shown in FIG. 3, eyes 41a, 41b are spaced apart by separator 44. In a preferred embodiment separator 44 is utilized to maintain equal positioning of compression ring 39 within groove 38. If a single, undivided slot is substituted for eyes 41a, 41b it may result that the compression force of ring 39 is predominant on one side of seat 13. This can result in a variation of the force, from side to side of device 10, required to accomplish release of tower base 21 from seat 13. Separator 44 maintains the position of compression ring 39 and equalizes the distribution of force applied to ring 39 by tensioning means 50.

Referring now to FIG. 4 the operation of coupler 18 (FIG. 1) and nipple 35 (FIG. 3) during operation conditions will be discussed. Once seat section 13 components of FIG. 3 are properly assembled, tower section 12 (FIG. 2) can be manually secured into seat section 13 and retained therein by registration of compression ring 39 in detent 70 of tower base or securing plate 21. The variable compression provided by ring 39 through the operation of tensioner means 50 will be discussed in detain hereinafter.

Once tower section 12 is connected to base section 13 as shown in FIG. 4 nipple 35 of seat section 13 extends through aperture 19 (FIG. 2) of tower base securing plate 21 and is available for attachment of coupler 18 thereto. In FIG. 4, coupler 18 is shown connected to nipple 35. Once coupler 18 is connected to nipple 35, valve 72 of coupler 18 and valve 74 of nipple 35 are brought into contact and each valve is forced into the open position by pressure from the opposing valve as shown in FIG. 4. Valve 72 and valve 74 are spring biased against their respective openings when coupler 18 is not attached to nipple 35. This is accomplished by springs 73, 75 attached respectively to valves 72, 74. Once coupler 18 is attached to nipple 35 and valves 72, 74 force each other into the open position the pressurized liquid or gas 71 available to flow from nipple 35 fills gas void 76 causing a pressurized zone which forces coupler 18 away from nipple 35. Separation of coupler 18 from nipple 35 when under such pressure is prevented by ball 77 of coupler 18 being forced inwardly by inner collar 78 and outer collar 79 of coupler 18.

Inner collar 78 and outer collar 79 comprise release collar 20 of coupler 18. High gas pressures in gas void 76, over time, will cause ball 77 to create a depression in release collar 20 unless a material of nearly equivalent hardness to ball 77 is used in the manufacture of release collar 20. This process of indenting or deforming of one part by another harder part is known as "brinelling". In the case of high pressure valves such as that of FIG. 4, ball 77 can become so well seated in release collar 20 due to this "brinelling" effect that separation of release collar 20 in a pressurized system is difficult if not impossible. This "brinelling" effect problem is overcome in the present invention through the use of a dual collar system presented by inner collar 78 and outer collar 79. Inner collar 78 is comprised of a material of similar hardness to that of ball 77 such as hardened stainless steel or steel. Utilizing materials of similar hardness in this fashion will minimize if not eliminate the "brinelling" effect. Inner collar 78 is surrounded by outer collar 79 which is composed of a non-sparking material such as brass.

Still referring to FIG. 4, during normal operation when it is desired to separate coupler 18 from nipple 35 in a pressurized system, force is applied in the direction of Arrow A to release ring 20 which allows ball 77 to move outwardly and away from capture by nipple 35 and permit separation of coupler 18 from nipple 35. The released position of collar 20 and the release of ball 77 from capture by nipple 35 may be seen in FIG. 11c.

Figures 5, 6, 7:
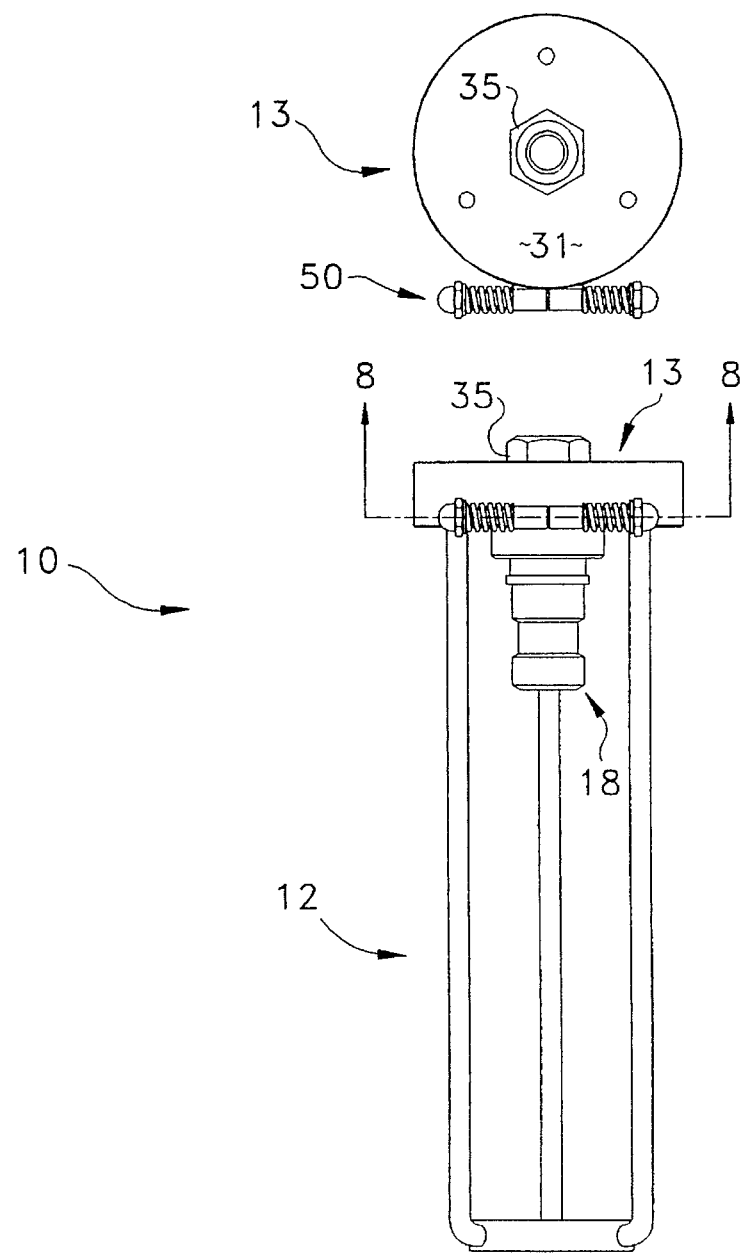
FIG. 5 is a top plan view of the seat section and tower section combined.
FIG. 6 is a bottom plan view of the seat section.
FIG. 7 is a side view of the tower section connected to the seat section with both in the inverted configuration and having the hose removed for clarity.

In FIG. 5, seat section 13 is shown in top plan view with tensioning means 50 held in position on wall 32 by the insertion of hooded eyes 40a, 40b (FIG. 2) in tensioner slot 53 (FIG. 2).

Referring to FIG. 6, a bottom plan view of seat section 13 is shown with tensioning means 50 positioned on sidewall 32 and nipple 35 in void 34 (FIG. 3) of bottom plate 31.

In FIG. 7, tower section 12 is shown connected to seat section 13 in side elevation. Coupler 18 is attached to nipple 35 which is press fitted into seat section 13 and retained therein by snap ring 36 (FIG. 2).

Figure 8:
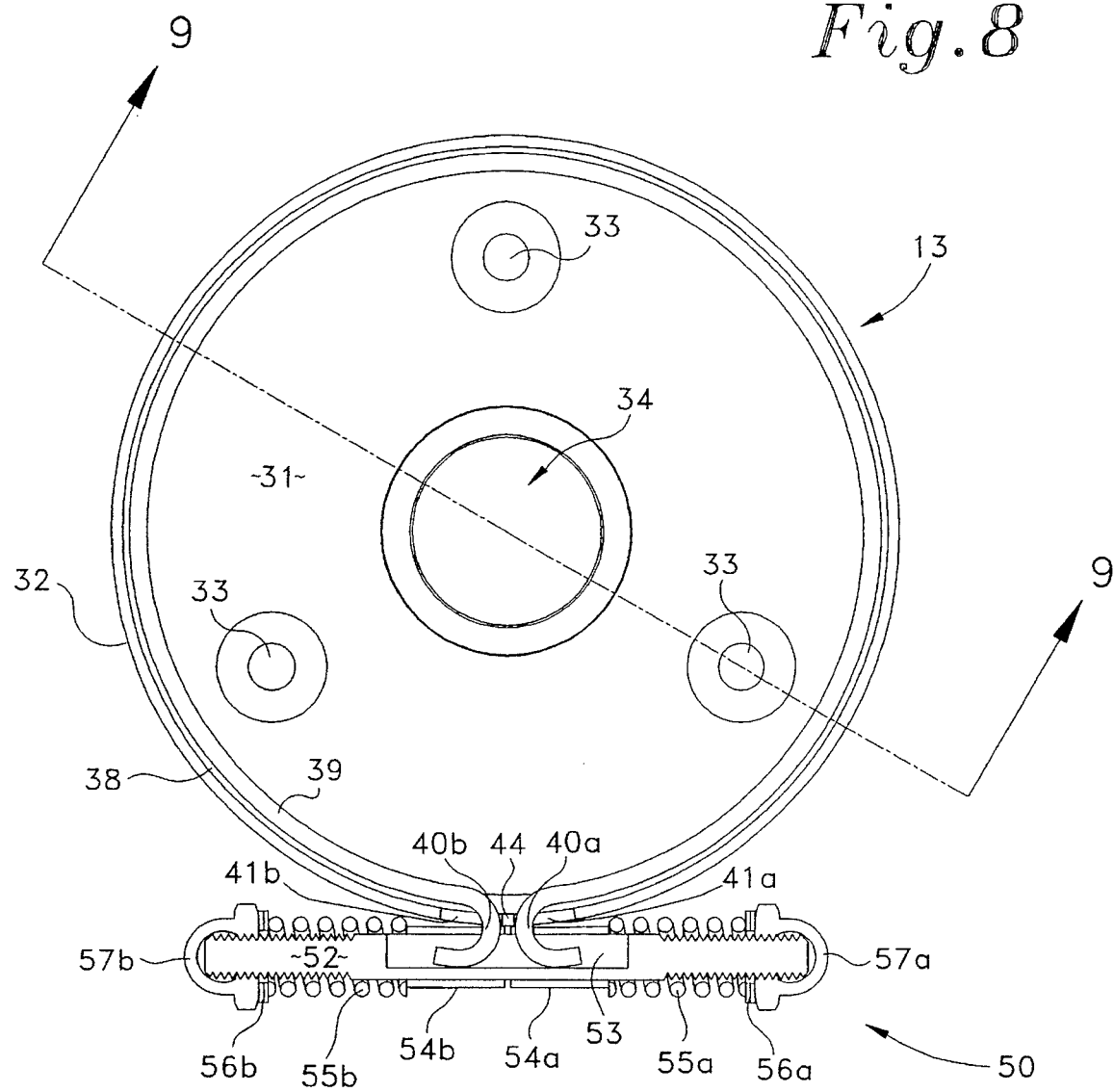
FIG. 8 is a cross-sectional view of the seat section taken along lines 8—8 of FIG. 7 and having the tower removed for clarity.

Referring now to FIG. 8, a cross-sectional view of base section 13 taken along line 9—9 of FIG. 7, the assembly of tensioning means 50 with compression ring 39 will be discussed. When compression ring 39 is to be assembled within base section 13 hooked ends 40a, 40b of compression ring 39 are inserted through eyes 41a, 41b of wall 32. Compression ring 39 fits into groove 38 on the interior of wall 32. In this manner hook ends 40a, 40b are presented for insertion into slot 53 of tensioner rod 52. In a preferred embodiment hooked ends 40a, 40b are retained within slot 53 by notches 58a, 58b (FIG. 3) of sleeves 54a, 54b. As previously indicated sleeves 54a, 54b are held in place by springs 55a, 55b and nuts 57a, 57b. Tensioning means 50 is then utilized to increase or decrease the constricting force of compression ring 39 by pressing together hooked ends 40a, 40b. The increased or decreased constriction of compression ring 39 results in an increased or decreased grip by compression ring 39 on tower base 21 (FIG. 2) resulting in an increase or decrease of the lateral force which must be applied to tower section 12 in order to release tower section 12 from seat section 13.

Figure 9:
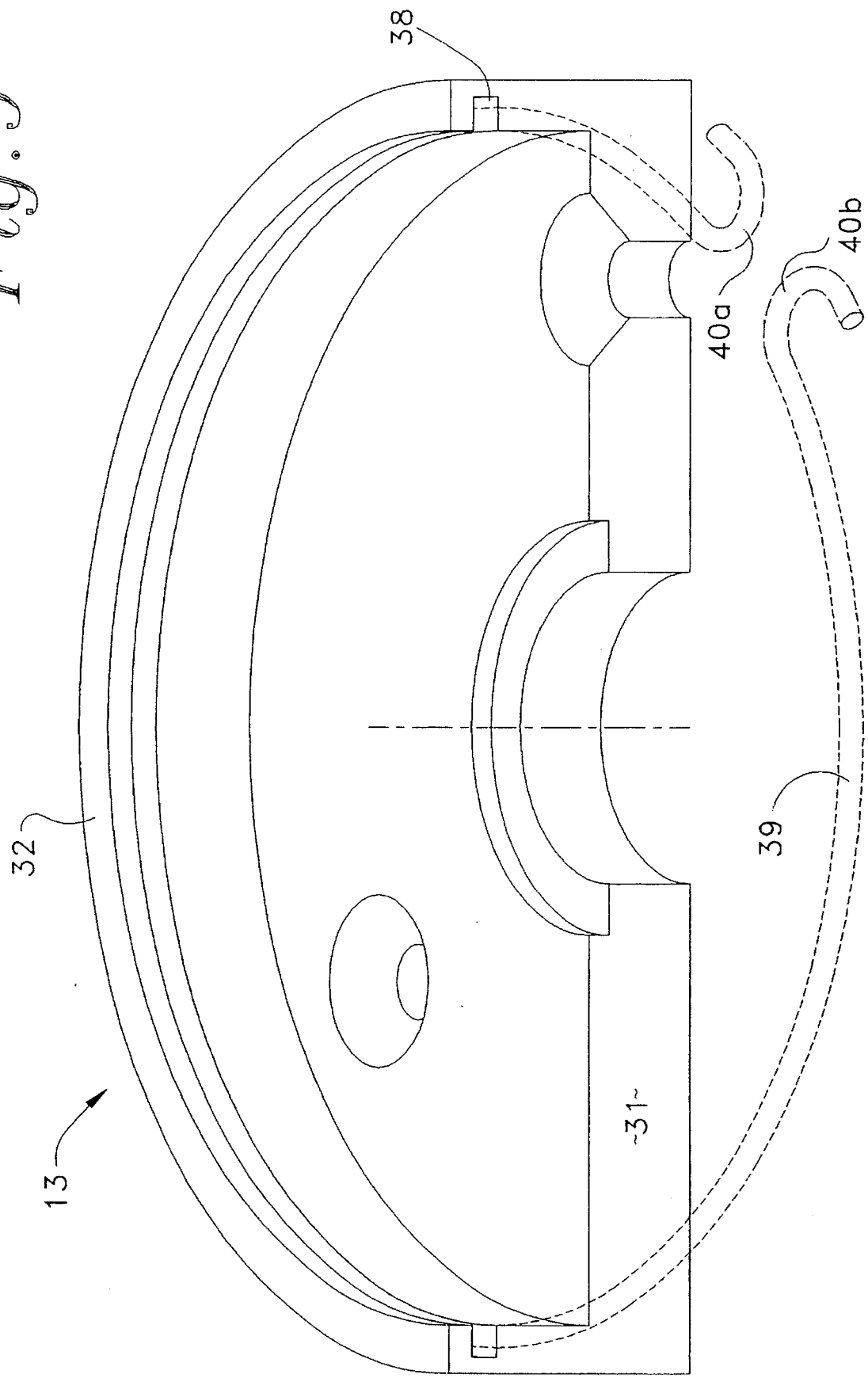
FIG. 9 is a cross-sectional perspective view of the seat section taken along lines 9—9 of FIG. 8 and showing the removed portion of the compression ring in phantom lines.

In FIG. 9 a cross sectional view of base section 13 taken along lines 9—9 of FIG. 8 is shown and the positioning of compression ring 39 within groove 38 of wall 32 of seat section 13. The additional portions of compression ring 39 extending beyond the cross-sectional view are shown in phantom lines.

Figure 10:
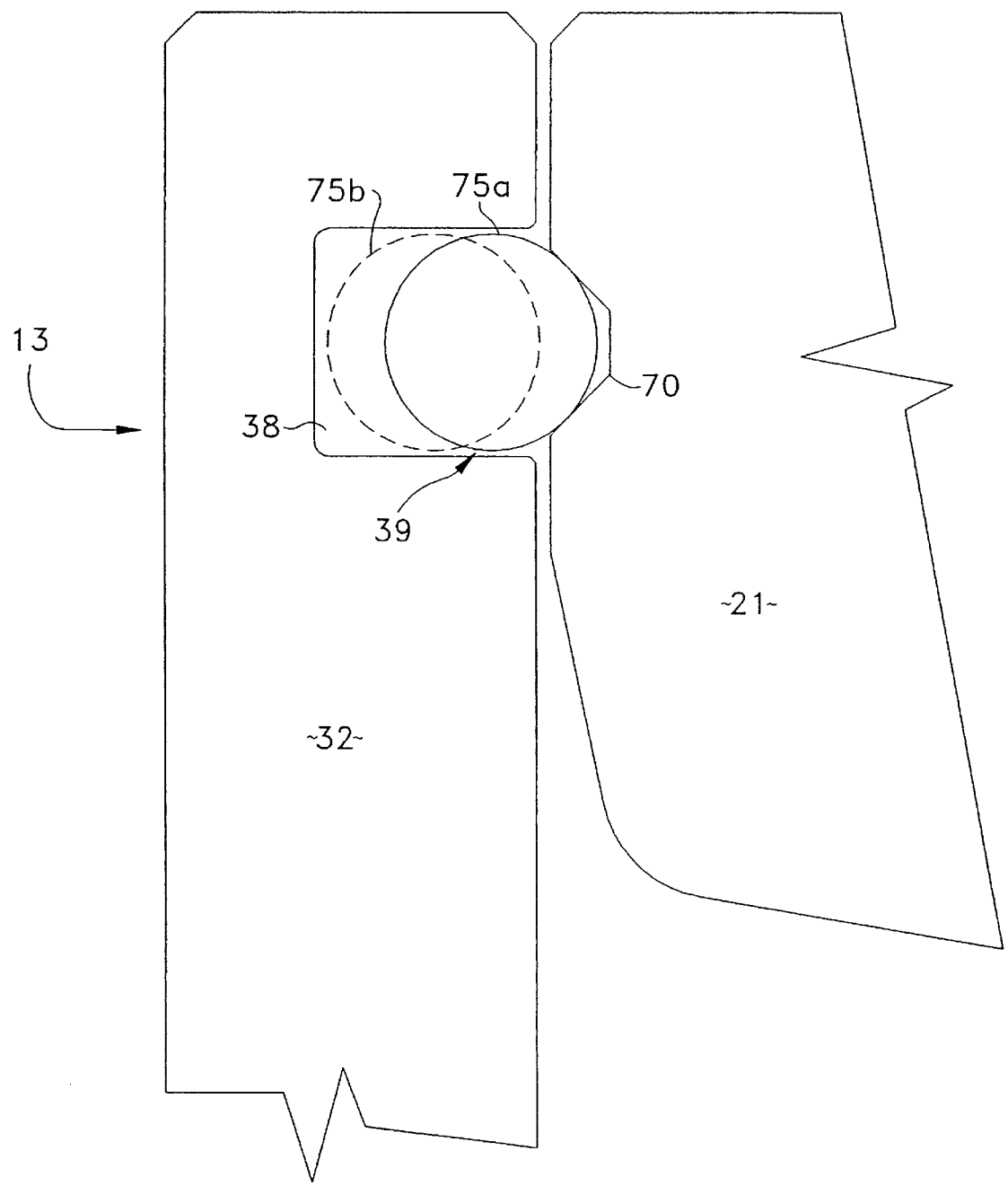
FIG. 10 is an enlarged fragmentary view taken along lines 10—10 of FIG. 5 showing the registration of the side wall of the seat and the compression ring therein and the annular detent of the tower base when the tower base is connected to the seat section.

Referring now to FIG. 10, the registration between compression ring 39 and tower base annular detent 70 will be discussed. When tower section 12 is inserted into seat section 13 annular detent 70 of tower base 21 is aligned with groove 38 of wall 32. Compression ring 39 contained within groove 38 can then be constricted into annular detent 70 by adjustment of tensioning means 50 (FIG. 8). As biasing of sleeves 54a, 54b (FIG. 8) against hooked ends 40a, 40b (FIG. 8) is lessened the constriction of compression ring 39 is reduced and compression ring 39 exerts less pressure against annular detent 70 of tower base 21 with a concomitant reduction in the amount of lateral pressure on tower section 12 required to effect separation of tower base 21 from the friction grip of compression ring 39 and displaces compression ring 39 into position 75b.

Oppositely, as tensioning means 50 is utilized to compress hooked ends 40a, 40b of compression ring 39 toward one another, the diameter of compression ring 39 is reduced and compression ring 39 is constricted toward position 75a and into annular detent 70 thereby creating an increased grip by compression ring 39 on tower base 21. When compression ring 39 is in position 75a the increased grip presented on tower base 21 increases the amount of lateral force on tower section 12 required for separation of tower section 12 from seat section 13.

Figures 11A, 11B:
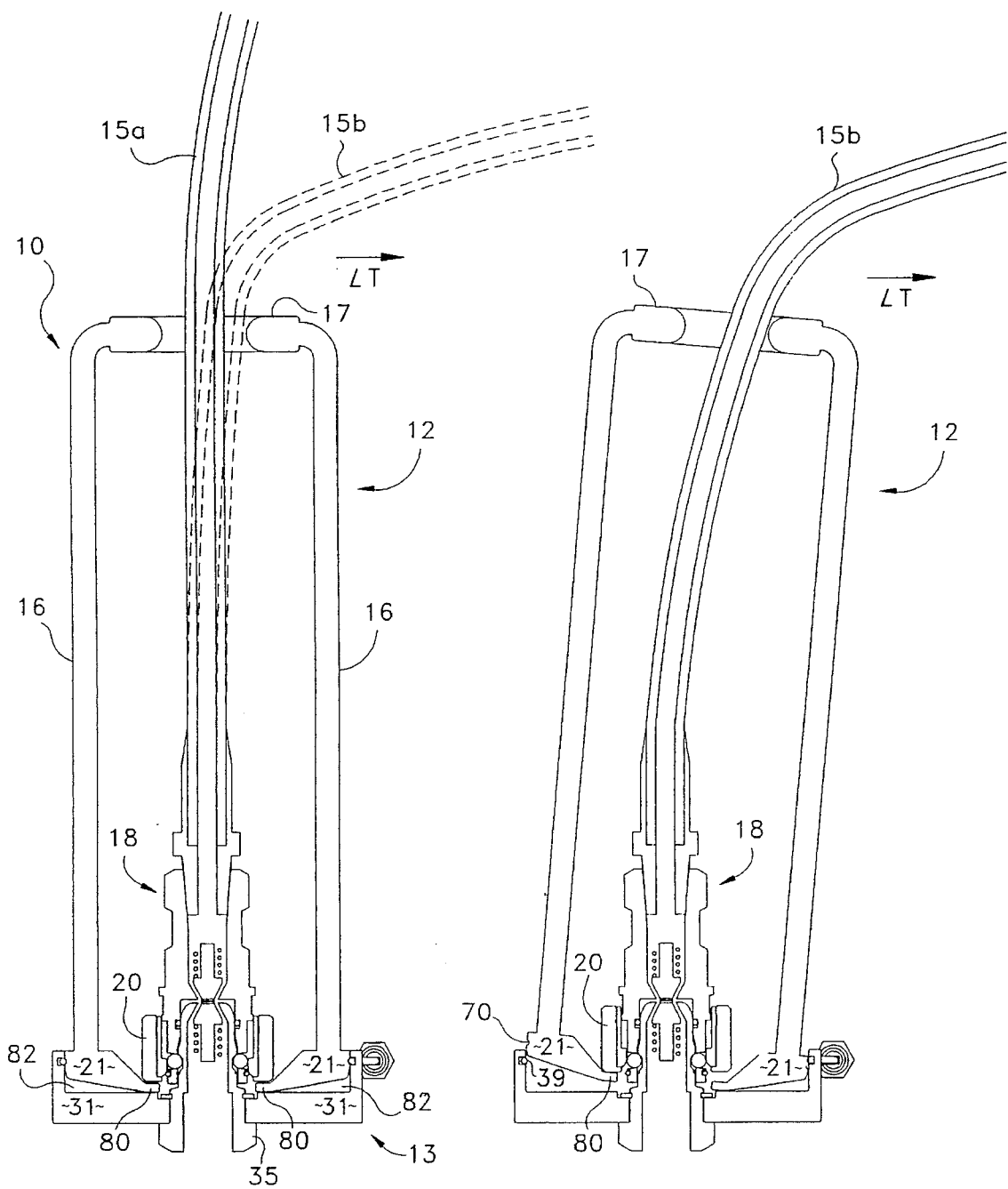
FIG. 11a is a cross-sectional view taken along lines 4—4 of FIG. 5 with the hose included to show the placement of the hose within the tower section during normal use and the hose presented in phantom lines during improper use.
FIG. 11b is the cross-sectional view of FIG. 11a showing the hose being laterally tensioned by a user against the tower containment ring and showing the initiation of the automatic uncoupling sequence resulting from excessive lateral tension on the tower and the lifting of the coupler release collar by the tower base.

Referring now to FIGS. 11a–11d, the operation and separation sequence of tower section 12 from seat section 13 will be described. In FIG. 11 a tower section 12 is shown positioned within seat section 13 with hose 15a extending through hose containment ring 17 and attached to coupler 18 which is seated on nipple 35 extending from seat section 13. As is shown in FIG. 11a, tower section 12 is connected to section 13 prior to attachment of coupler 18 to nipple 35. This sequence of connection positions flange 80 of tower base 21 underneath release collar 20 of coupler 18. It can be observed in FIG. 11a, that the bottom face of tower base 21 is angled away from bottom plate 31 of seat 13 to create void 82. the operation of automatic hose uncoupling device 10 will now be described.

When device 10 is in use under proper circumstances hose 15 (FIG. 1) is generally centered within hose containment ring 17 as shown in FIG. 11 a by hose 15a. When a user attempts to extend hose 15 beyond a safe operating distance tension is provided to hose 15 by the user. This creates a lateral tension as shown by Arrow LT of FIGS. 11a–11d. The lateral tension on hose 15 moves the hose from normal operating position 15a (FIG. 11a) to laterally tensioned position 15b (FIG. 11a). As the lateral tensioning by a user increases hose 15b pressed against hose containment ring 17. This lateral tensioning of hose 15b exerts a lateral forced on hose containment ring 17 and begins to force tower section 12 laterally. The lateral pressure thus communicated by rods 16 begins to press the side of tower section 12 receiving the pressure downwardly allowing tower base 21 to move into void 82. As shown in FIG. 11b, once sufficient lateral pressure is applied to tower section 12, by hose 15b, the side of tower base 21 opposite to the side receiving lateral tension, receives sufficient pressure that annular groove 70 is released from capture by compression ring 39 thereby allowing flange 80 to press upwardly on release collar 20 of coupler 18.

In FIG. 11c, sufficient lateral tension has been applied to hose 15b that flange 80 of tower base 21 has fully upwardly disposed release collar 20 to allow ball 77 to move outwardly from nipple 35 thereby breaking the securing of coupler 18 to nipple 35 and allowing the existing gas pressure in void 76 (FIG. 4) to complete the separation of coupler 18 from nipple 35 and allowing tower section 12 containing hose 15 and coupler 18 to fall away from nipple 35 and seat section 13 as shown in FIG. 11d.

It will be appreciated from examination of FIGS. 11a–11c that tower base 21 is closely fitted against wall 32 of seat section 13. The close fit results in a lateral displacement of tower base 21 in a direction opposite of lateral tension LT. The displacement of tower base 21 during the course of lateral tensioning and separation of tower section 12 from seat section 13 serves to maintain flange 80 in a generally centered location underneath release collar 20. This centering of flange 80 with respect to release collar 20 avoids application of leverage force or interference to nipple 35 or coupler 18 during the release operation.

Figure 12A:
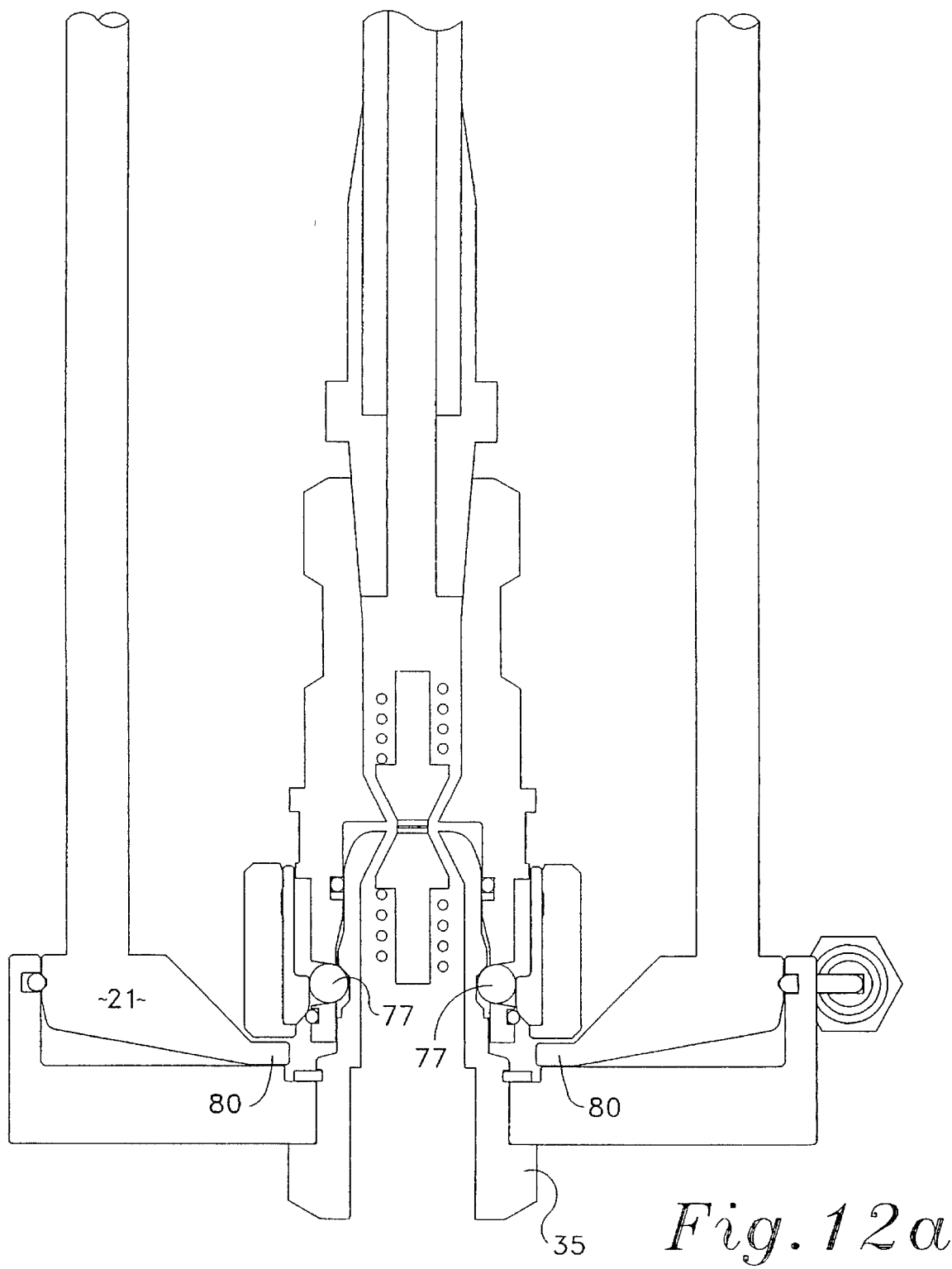
Figure 12B:
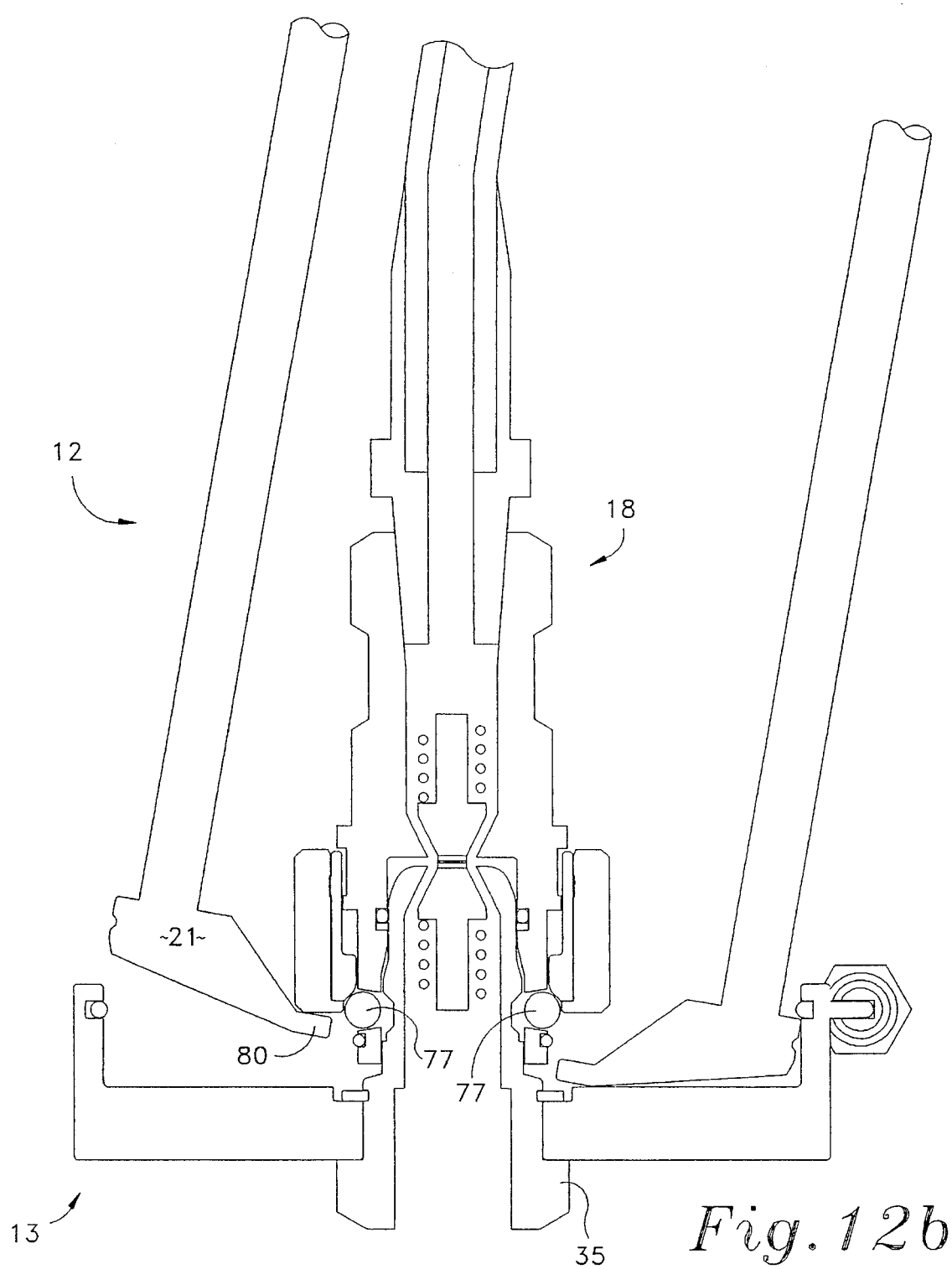
FIG. 12b is an enlarged fragmentary view of FIG. 11c.

Referring to FIGS. 12a and 12b, enlarged fragmentary views of 11a and 11c are presented to allow better observation of the repositioning of tower base 21 and tower base flange 80 under a lateral force and the upward movement of release collar 20 permitting release of ball 77 from capture by nipple 35.

Figure 13:
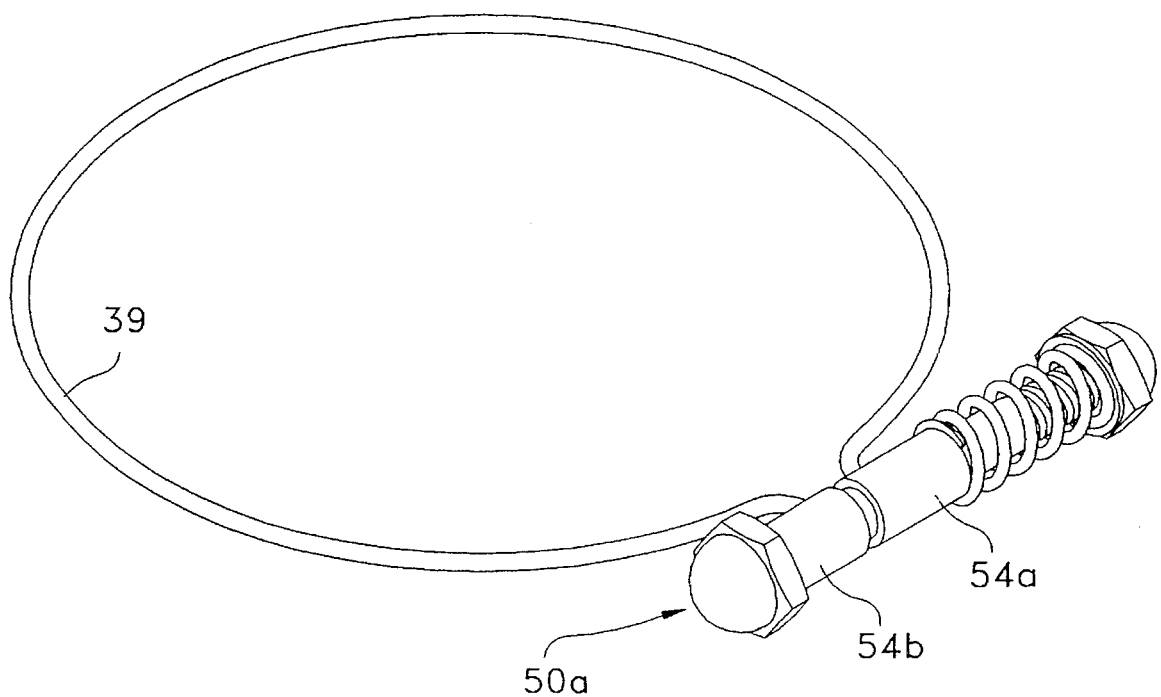
FIG. 13 is a perspective view of an alternative embodiment of the tensioner means used to vary the compression ring diameter.

Referring to FIG. 13 and alternative arrangement of tensioner means 50a is shown utilizing a single spring biasing of only one of sleeves 54a, 54b in order to compress and release hooked ends 40a, 40b (FIG. 3) of compression ring 39.

Figure 14:
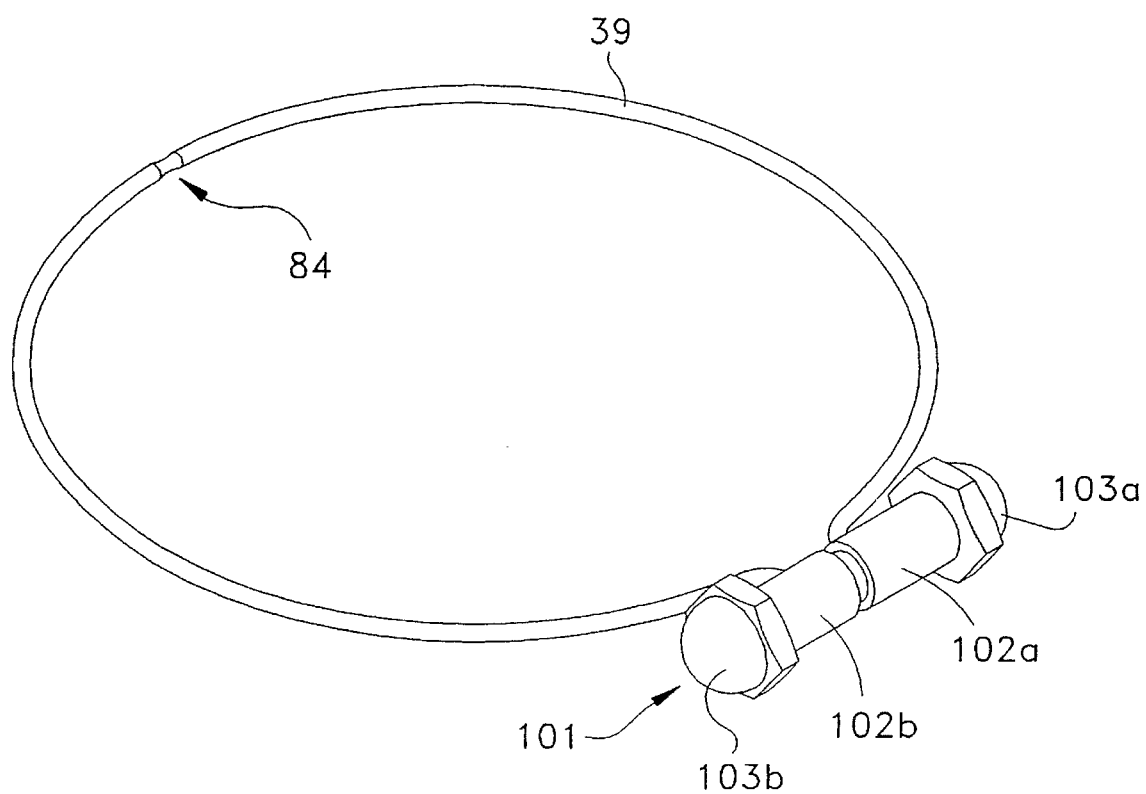
FIG. 14 is a perspective view of an alternative embodiment of the compression ring showing the use of a breakpoint for release of the compression ring and showing the use of a securing compression shim as an alternative to a tensioning means.

In FIG. 14, an alternative embodiment of compression ring 39 is shown. Compression ring 39 is provided with break point 84 which is a weakened section of compression ring 39. Break point 84 may consist of a reduced diameter section of compression ring 39 or may be achieved by partially cutting through the material composing compression ring 39 to provide weakened point in compression ring 39 which will break under the previously described lateral pressure thereby suddenly releasing tower base 21 from capture in seat 13. In the embodiment of FIG. 14 tensioner means 50 (FIG. 2) may be replaced with securing device 101 which captures hooked ends 40a, 40b of compression ring 39 between sleeves 102a, 102b through pressure provided by nuts 103a, 103b.

Figure 15:
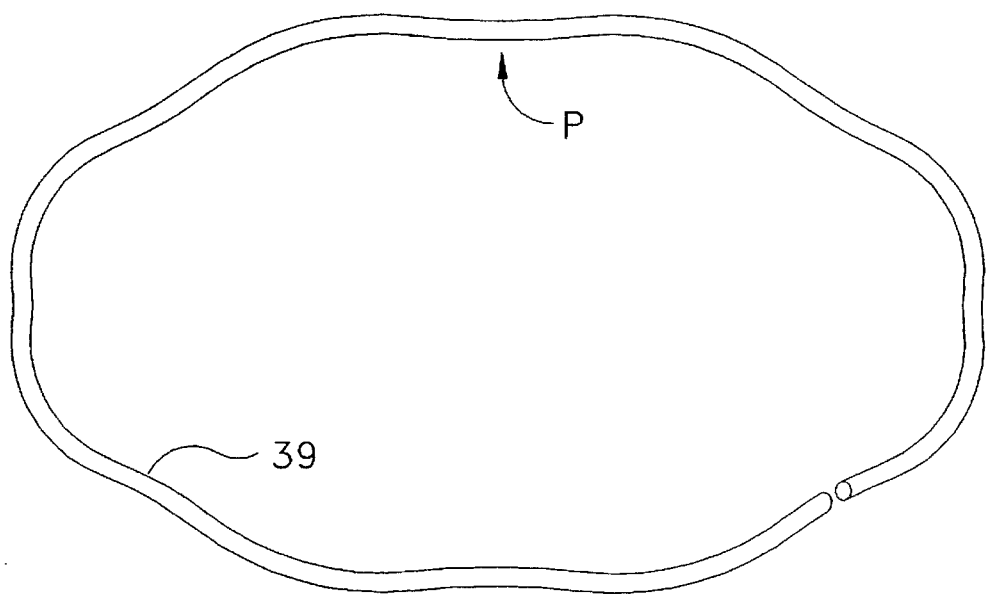
FIG. 15 is a perspective view of an alternative embodiment of the compression ring which utilizes a wave form shape to provide pre-set compression on the tower base.
Figure 16:
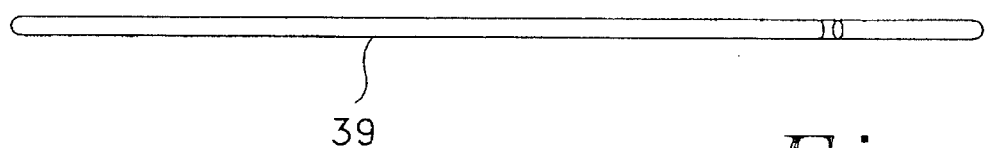
FIG. 16 is a side elevational view of the compression ring of FIG. 15.

In FIGS. 15 and 16 another alternative embodiment of compression ring 39 is shown. In FIG. 15, compression ring 39 is provided with a wave shape which may be fitted into groove 38 of seat section 13. Projecting portions "P" of the compression ring of FIG. 15 extend from groove 38 and into annular detent 70 of tower base 21. The compression ring form of FIG. 15 provides a predetermined amount of force against annular detent 70 which must be overcome in order to release tower section 12 from seat section 13. It will be appreciated by those skilled in the art that by varying the amplitude of the wave of the compression ring of FIG. 15 or the composition of the metal composing the compression ring that the amount of lateral tension required to overcome the grip of compression ring 39 within annular detent 70 (FIG. 10) that variation can be made in the amount of lateral force required to achieve release of tower 12 from seat 13.

In FIG. 16, a side elevational view of the compression ring of FIG. 15 is shown. It can be observed that the compression ring of FIG. 15 is adapted for insertion into groove 38 of wall 32 of seat 13 (FIG. 2).

Figure 17:
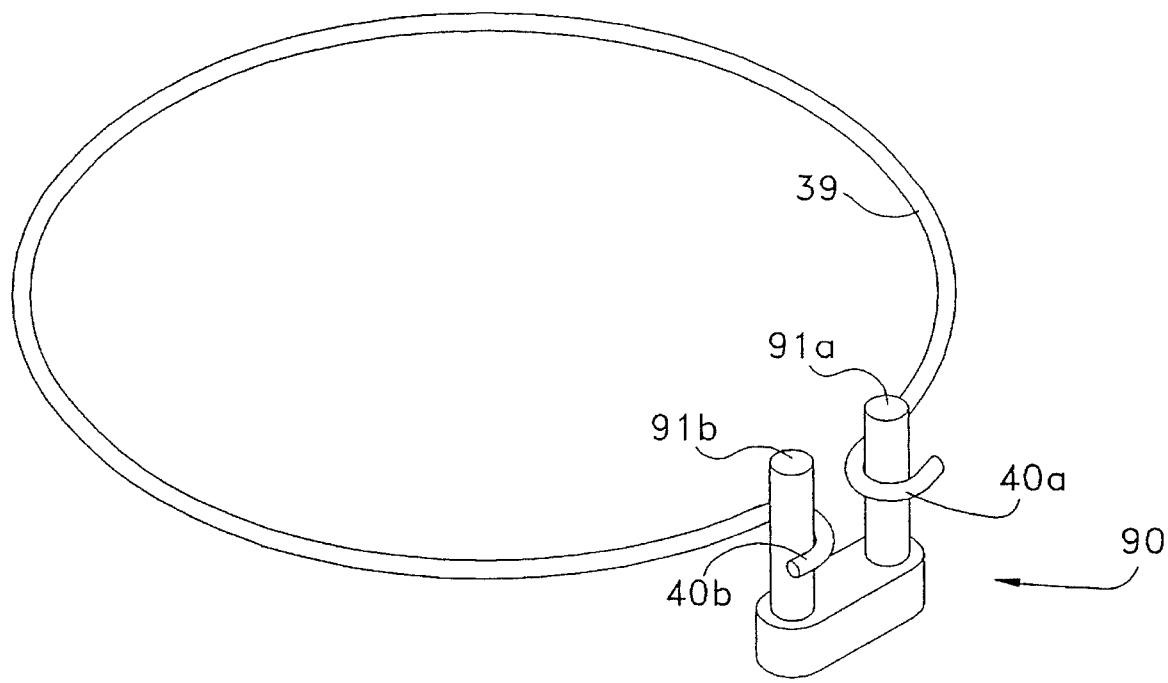
FIG. 17 shows an alternative embodiment securing means for the compression ring comprising break-away pins for securing the ends of the compression ring.

Referring now to FIG. 17, an alternative securing means 90 is shown for capture of hooked ends 40a, 40b of compression ring 39. In this form hooked ends 40a, 40b are secured on breakaway posts 91a, 91b. When sufficient lateral force is provided to tower section 12 (FIG. 11a–d), the force communicated to tower base 21 (FIG. 11) causes expansive force on compression ring 39 resulting in the breaking of posts 91a, 91b by hooked ends 40a, 40b, thereby allowing release of tower section 12 from seat 13.

Certain changes may be made in embodying the above invention, and in the construction thereof, without departing from the spirit and scope of the invention. It is intended that all matter contained in the above description and shown in the accompanying drawings shall be interpreted as illustrative and not meant in a limiting sense.

It is also to be understood that the following claims are intended to cover all of the generic and specific features of the invention herein described, and all statements of the scope of the invention which, as a matter of language, might be said to fall therebetween

What is claimed as new and desired to secured by Letters Patent is as follows:

1. An apparatus to effect automatic separation between connected male and female, first and second, portions of a high-pressure hose breakaway coupling, said portions being separable upon the longitudinal axial-shifting of a coupling release collar to break the securing together of the male and female portions and permit the high-pressure contents of the hose to separate the portions, the apparatus comprising:

a hose receiving means comprising
a ring for insertion of the release collar-containing first coupling portion high-pressure hose therethrough to contain the hose,
a base having an upper base side and a lower base side and a generally central aperture communicating therebetween, said aperture having a flange about the aperture perimeter for engaging the coupling release collar, said lower base side sloping upwardly from said flange to an outer base edge, said outer base edge having a groove thereon,
a leg extending to connect said ring and said upper base side, and a seat with an upwardly extending sidewall adapted to receive said base therein, said seat further adapted to secure the second portion of the high-pressure breakaway coupling thereon for extension through said base aperture to permit connection between said first coupling portion and said second coupling portion, a compressible band, said sidewall having a depression therein for holding said compressible band therein, said band providing constrictive capture of said outer base edge groove to retain said base in position within said seat until a sufficient lateral pressure is applied to said hose receiving means to depress said sloping lower base side opposite said applied force against said seat and to sufficiently elevate said flange adjacent said applied force in order to lift said release collar to effect separation of said coupling portions by the pressure of the hose contents.

2. The apparatus as claimed in claim 1 further comprising means for adjusting the constrictive capture force applied by said compressible band against said groove for variation of the lateral pressure required to release said base from capture to allow movement of said base and elevation of said flange to effect lifting of said release collar.

3. The apparatus as claimed in claim 2 wherein said means for adjusting comprises a compressible band having first and second ends, a pair of sleeves opposably mounted on a threaded rod for engagement with said band ends, and a pair of threaded fasteners for attachment to said rod to position said sleeves on said rod in order to reduce and expand the diameter of said band to accomplish variation in constrictive capture force.

4. The apparatus as claimed in claim 1 wherein the application of sufficient lateral pressure causes rupture of a weak point of said compressible band so that said base is released from constrictive capture to allow depression of said sloping lower base side opposite said applied force against said seat for elevation of said flange adjacent said applied force.

5. The apparatus as claimed in claim 1 wherein said compressible band presents first and second ends, said ends being attached to a pair of posts supported on said seat exterior, said posts being separable from said seat upon application of sufficient tension from said band such that separation of said posts releases said base from capture to allow movement of said base and elevation of said flange to effect lifting of said release collar.

* * * * *